(12) United States Patent
Sugiyama et al.

(10) Patent No.: US 7,679,663 B2
(45) Date of Patent: Mar. 16, 2010

(54) PHOTODETECTION APPARATUS

(75) Inventors: Yukinobu Sugiyama, Hamamatsu (JP); Seiichiro Mizuno, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 859 days.

(21) Appl. No.: 11/260,229

(22) Filed: Oct. 28, 2005

(65) Prior Publication Data

US 2006/0109361 A1    May 25, 2006

Related U.S. Application Data

(63) Continuation-in-part of application No. PCT/JP2005/014910, filed on Aug. 15, 2005.

(30) Foreign Application Priority Data

Aug. 26, 2004    (JP) .......................... P2004-247183

(51) Int. Cl.
H04N 3/14    (2006.01)
H01L 29/207   (2006.01)
G01J 1/42    (2006.01)

(52) U.S. Cl. .................. 348/298; 348/308; 348/312; 257/98; 250/208.5

(58) Field of Classification Search .......... 348/298, 348/308, 312, 317, E21.021, E21.023, E21.029, 348/E21.031; 257/E27.13, 98; 250/208.5
See application file for complete search history.

(56) References Cited

U.S. PATENT DOCUMENTS

| 6,486,460 B1 * | 11/2002 | Murakami et al. ....... 250/208.1 |
| 6,697,114 B1 * | 2/2004 | Merrill ................. 348/308 |
| 6,760,070 B1 * | 7/2004 | Merrill et al. ........... 348/294 |
| 6,809,769 B1 * | 10/2004 | Yang ................... 348/308 |
| 6,831,691 B1 * | 12/2004 | Takada et al. ............ 348/308 |
| 6,882,367 B1 * | 4/2005 | Merrill et al. ............ 348/308 |
| 6,927,796 B2 * | 8/2005 | Liu et al. ............... 348/297 |
| 6,982,759 B2 * | 1/2006 | Goto ................... 348/302 |
| 7,116,366 B1 * | 10/2006 | Berezin et al. ........... 348/308 |

FOREIGN PATENT DOCUMENTS

| JP | 63-038256 | 2/1988 |
| JP | 63-053968 | 3/1988 |
| JP | 04-357423 | 12/1992 |
| JP | 11-274454 | 10/1999 |

(Continued)

*Primary Examiner*—Howard Weiss
*Assistant Examiner*—Steven H Rao
(74) *Attorney, Agent, or Firm*—Drinker Biddle & Reath LLP (57) ABSTRACT

A pixel section $P_{m,n}$ includes a photodiode PD, a first capacitance section $C_1$, a second capacitance section $C_2$, and transistors $T_1$-$T_6$. The transistor $T_1$ transfers the electric charge generated by the photodiode PD to the first capacitance section $C_1$. The transistor $T_2$ transfers the electric charge generated by the photodiode PD to the second capacitance section $C_2$. The amplification transistor $T_3$ outputs a voltage value corresponding to the amount of electric charge accumulated in the first capacitance section $C_1$. The transistor $T_4$ selectively outputs to the wiring $L_{1,n}$ the voltage value outputted from the amplification transistor $T_3$. The transistors $T_3$ and $T_4$ constitute a source follower circuit. The transistors $T_5$ and $T_6$ selectively output to the wiring $L_{2,n}$ the electric charge accumulated in each of the first capacitance section $C_1$ and the second capacitance section $C_2$.

14 Claims, 10 Drawing Sheets

FOREIGN PATENT DOCUMENTS

| | | |
|---|---|---|
| JP | 2000-165754 | 6/2000 |
| JP | 2002-077733 | 3/2002 |
| JP | 2002-340670 | 11/2002 |
| JP | 2005-034511 | 4/2005 |
| WO | 99/34592 | 7/1999 |
| WO | 99/54912 | 10/1999 |

* cited by examiner

PHOTODETECTION APPARATUS

RELATED APPLICATION

This is a continuation-in-part application of application serial no. PCT/JP2005/014910 filed on Aug. 15, 2005, now pending.

TECHNICAL FIELD

The present invention relates to a photodetection apparatus for converting light into an electric signal and then outputting the signal.

RELATED BACKGROUND ART

Photodetection apparatuses are known that employ the CMOS (Complementary Metal Oxide Semiconductor) technique. Among these, in particular, those employing an active pixel method are well known (see, for example, Patent Document 1). Such a photodetection apparatus of the active pixel method comprises an active pixel type pixel section including a photodiode for generating electric charge of an amount corresponding to incident light intensity, and thereby performs charge-voltage conversion on the electric charge generated by the photodiode in correspondence to the light incidence in the pixel section, via a source follower circuit composed of a transistor. This photodetection is achieved with high sensitivity and low noise.

When the charge accumulation capacitance value is denoted by $C_f$ in a floating diffusion region for accumulating the electric charge generated by the photodiode in the pixel section, and when the amount of the electric charge is denoted by Q, the output voltage value V acquired by the charge-voltage conversion is expressed by a formula $V=Q/C_f$. As seen from this formula, when the charge accumulation capacitance value $C_f$ of the floating diffusion region is reduced, the sensitivity can be increased in the photodetection.

Patent Document 1: Japanese Patent Laid-Open publication No. Hei-11-274454

Nevertheless, the output voltage value V is restricted to a few V at maximum owing to the available range of the supply voltage and various limitations in the circuit system. Further, the amount Q of electric charge that can be accumulated in the floating diffusion region also has an upper limit. This also places a restriction on the output voltage value V.

In order to increase the upper limit (saturation electric charge amount) of the amount Q of electric charge which can be accumulated in the floating diffusion region, the charge accumulation capacitance value $C_f$ of the floating diffusion region may be increased, or alternatively the supply voltage value may be increased. Nevertheless, the increasing of the capacitance value $C_f$ of the floating diffusion region requires the reducing of the supply voltage value. As a result, no increased saturation electric charge amount is obtained. Further, when the charge accumulation capacitance value $C_f$ of the floating diffusion region is increased, the remarkable advantage of high sensitivity is lost.

As such, a prior art photodetection apparatus can perform photodetection with high sensitivity, but has the disadvantage of a narrow dynamic range of the photodetection caused by the restriction in the saturation electric charge amount.

SUMMARY OF THE INVENTION

The invention has been devised in order to resolve the above-mentioned problem. An aspect of the invention is to provide a photodetection apparatus capable of performing photodetection with high sensitivity and a wide dynamic range.

It is one aspect of the present invention to provide a photodetection apparatus comprising: (1) a pixel section including a photodiode for generating electric charge of an amount corresponding to incident light intensity, a first capacitance section for accumulating the electric charge generated by the photodiode, a second capacitance section having a larger charge accumulation capacitance than the first capacitance section and thereby accumulating the electric charge generated by the photodiode, first transfer means and second transfer means for transferring the electric charge generated by the photodiode respectively to the corresponding first capacitance section and the second capacitance section, an amplification transistor a gate terminal of which is connected to the first capacitance section and which outputs a voltage value corresponding to the amount of electric charge accumulated in the first capacitance section, first output means for selectively outputting the voltage value outputted from the amplification transistor, second output means for selectively outputting the electric charge accumulated in each of the first capacitance section and the second capacitance section, and initializing means for initializing the electric charge of each of the first capacitance section and the second capacitance section; (2) a first signal processing section for reading the voltage value outputted by the first output means of the pixel section and thereby outputting a first voltage value corresponding to the voltage value; and (3) a second signal processing section for reading the electric charge amount outputted by the second output means of the pixel section and thereby outputting a second voltage value corresponding to the electric charge amount.

In this photodetection apparatus, in the pixel section, when the photodiode generates electric charge of an amount corresponding to incident light intensity, the electric charge is transferred by the first transfer means and then accumulated in the first capacitance section, or alternatively transferred by the second transfer means and then accumulated in the second capacitance section. A voltage value corresponding to the amount of electric charge accumulated in the first capacitance section is outputted from the amplification transistor. The voltage value is selectively outputted from the pixel section by the first output means. The electric charge accumulated in each of the first capacitance section and the second capacitance section is selectively outputted from the pixel section by the second output means. The voltage value outputted by the first output means of the pixel section is read by the first signal processing section, so that a first voltage value corresponding to the voltage value is outputted. Further, the electric charge amount outputted by the second output means of the pixel section is read by the second signal processing section, so that a second voltage value corresponding to the electric charge amount is outputted. The first voltage value expresses with high sensitivity the incident light intensity on the pixel section. On the other hand, the second voltage value expresses with a wide dynamic range the incident light intensity on the pixel section.

Preferably, in the photodetection apparatus according to the invention, (1) the pixel section further includes third output means for selectively outputting the electric charge generated by the photodiode via a route not passing through the first capacitance section and the second capacitance section, while (2) the apparatus further comprises a third signal processing section for reading the electric charge amount outputted by the third output means of the pixel section and thereby outputting a third voltage value corresponding to the electric charge amount. The second signal processing section may also serve as the third signal processing section. In this case, the electric charge generated by the photodiode of the pixel section is selectively outputted by the third output means via a route not passing through the first capacitance section and the second capacitance section. The amount of the electric charge is read by the third signal processing section so that a third voltage value corresponding to the electric charge amount is outputted. This third voltage value expresses the incident light intensity on the pixel section with a much wider dynamic range.

Preferably, the second signal processing section includes: (1) an amplifier which includes a first input terminal, a second input terminal, and an output terminal, and in which the first input terminal receives the electric charge amount outputted by the second output means of the pixel section while the second input terminal receives a reference voltage; and (2) a feedback capacitance section connected between the first input terminal and the output terminal of the amplifier, wherein the electric charge amount outputted by the second output means of the pixel section is accumulated in the feedback capacitance section, so that a second voltage value corresponding to the amount of accumulated charge is outputted. Further, preferably, the first input terminal of the amplifier of the second signal processing section is connected via a common terminal to the second output means and the initializing means of the pixel section, while the value of the reference voltage inputted to the second input terminal of the amplifier of the second signal processing section is variable. In this case, preferably, the capacitance value of the feedback capacitance section is variable.

Preferably, the photodetection apparatus according to the invention further comprises a selecting section for receiving the first voltage value outputted from the first signal processing section and the second voltage value outputted from the second signal processing section and thereby selecting and outputting any one of these voltage values consisting of the first voltage value and the second voltage value. Further, when the third signal processing section is provided, the photodetection apparatus according to the invention, preferably, further comprises a selecting section for receiving the first voltage value outputted from the first signal processing section, the second voltage value outputted from the second signal processing section, and the third voltage value outputted from the third signal processing section, and thereby selecting and outputting any one of these voltage values consisting of the first voltage value, the second voltage value, and the third voltage value. Preferably, the photodetection apparatus further comprises an A/D conversion section for receiving the voltage value outputted from the selecting section, thereby performing A/D conversion, and then outputting a digital value corresponding to the voltage value. Moreover, preferably, the photodetection apparatus further comprises a bit shift section for receiving the digital value outputted from the A/D conversion section, then shifting the bit of the digital value depending on which value has been selected in the selecting section, and then outputting the value.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

The invention realizes photodetection with high sensitivity and a wide dynamic range.

BEST MODES FOR CARRYING OUT THE INVENTION

The best mode for carrying out the invention is described below in detail with reference to the accompanying drawings. In the following description of the drawings, like components are designated by like numerals so that overlapping description is omitted. Further, M and N indicate integers greater than or equal to 2, while m indicates an arbitrary integer ranging from 1 to M inclusive, and while n indicates an arbitrary integer ranging from 1 to N inclusive.

Figure 1:
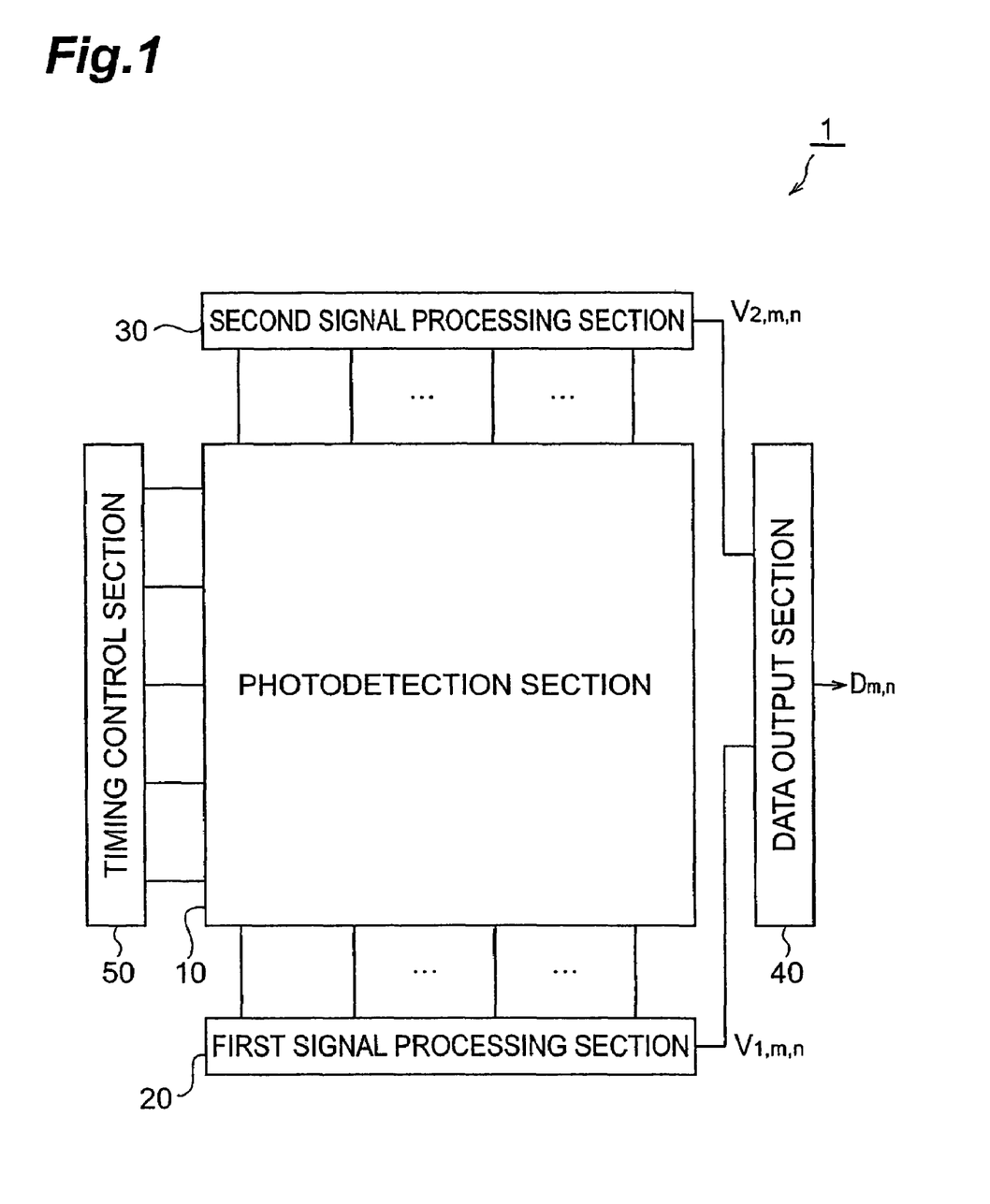
FIG. 1 is a schematic configuration diagram of a photodetection apparatus 1 according to an embodiment of the invention.
Figure 2:
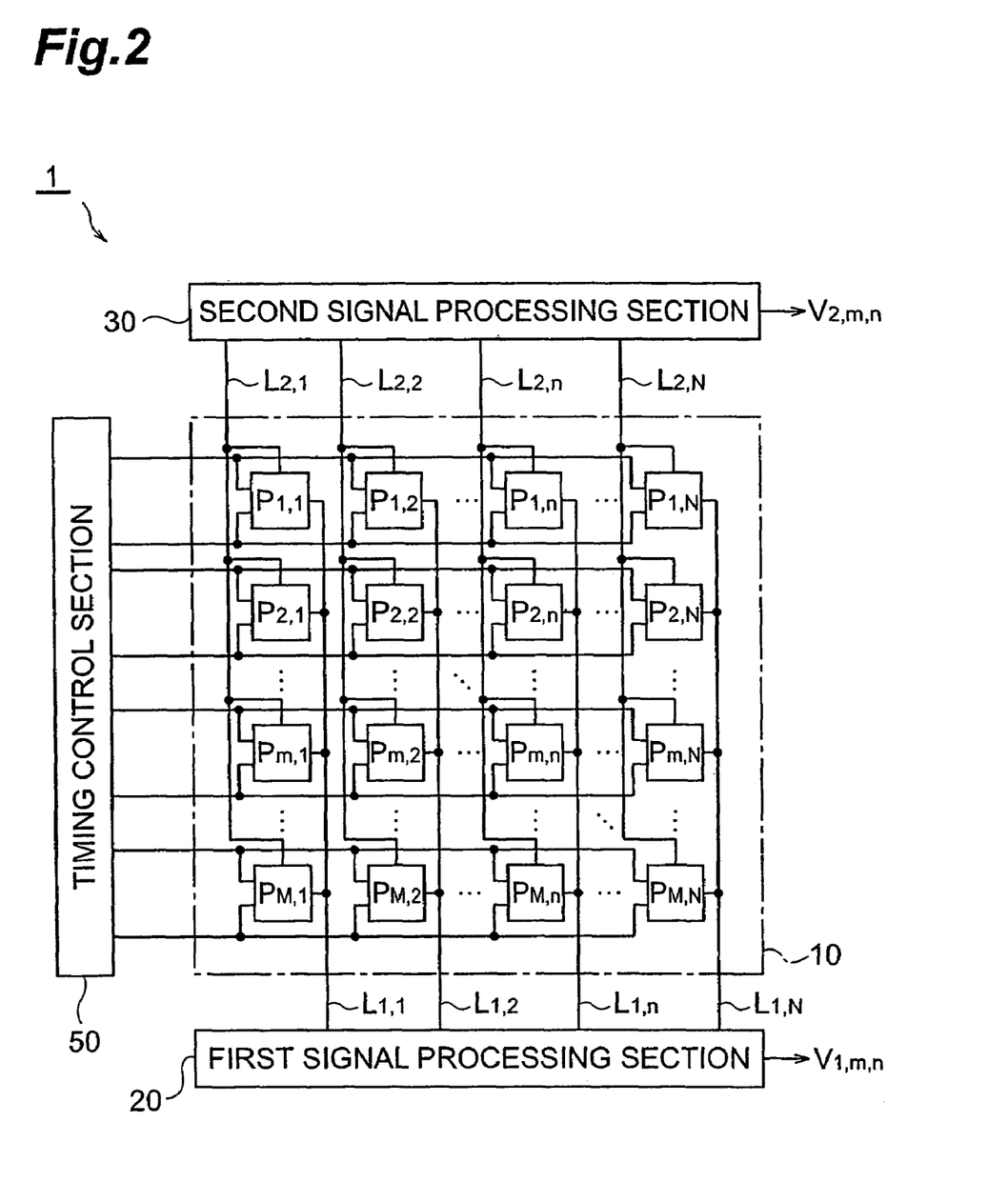
FIG. 2 is a configuration diagram of a photodetection section 10 of a photodetection apparatus 1 of FIG. 1.

FIG. 1 is a schematic configuration diagram of a photodetection apparatus 1 serving as an embodiment of the invention. FIG. 2 is a configuration diagram of a photodetection section 10 of this photodetection apparatus 1. The photodetection apparatus 1 shown in these figures comprises a photodetection section 10, a first signal processing section 20, a second signal processing section 30, a data output section 40, and a timing control section 50. These components are preferably formed on a common semiconductor substrate. In this case, the arrangement on the substrate is preferably as shown in the figure. Here, the timing control section 50 for controlling the operation of the entire photodetection apparatus 1 may be divided into sub-sections and arranged at mutually distant positions on the substrate.

The photodetection section 10 comprises M×N pixel sections $P_{m,n}$ arranged in two dimensions of M rows and N columns. Each pixel section $P_{m,n}$ is located at m-th row and n-th column. Each pixel section $P_{m,n}$ has a common configuration including a photodiode and the like. Then, each pixel section $P_{m,n}$ outputs to a wiring $L_{1,n}$ a voltage value corresponding to the intensity of light made incident on the photodiode, and outputs to a wiring $L_{2,n}$ the electric charge of the amount corresponding to the light intensity. Each wiring $L_{1,n}$ is connected in common to the output terminal of each of the M pixel sections $P_{1,n}$-$P_{M,n}$ in the n-th column. Further, each wiring $L_{2,n}$ is connected in common to another terminal of each of the M pixel sections $P_{1,n}$-$P_{M,n}$ the n-th column.

The first signal processing section 20 is connected to the N wirings $L_{1,1}$-$L_{1,N}$, thereby receives the voltage value outputted from each pixel section $P_{m,n}$ to the wiring $L_{1,n}$, and then, after performing predetermined processing, outputs sequentially a first voltage value $V_{1,m,n}$ indicating the pixel data. Each voltage value $V_{1,m,n}$ has a value corresponding to the intensity of light made incident on the pixel section $P_{m,n}$. In particular, this first voltage value $V_{1,m,n}$ expresses with high precision the result of high sensitivity detection of the incident light intensity of the case when the capacitance section of the pixel section $P_{m,n}$ is not saturated, that is, of the case when the intensity of the light made incident on the pixel section $P_{m,n}$ is comparatively low.

The second signal processing section 30 is connected to the N wirings $L_{2,1}$-$L_{2,N}$, thereby receives the electric charge outputted from each pixel section $P_{m,n}$ to the wiring $L_{2,n}$ then accumulates the electric charge in the capacitance section, and then outputs sequentially a second voltage value $V_{2,m,n}$ corresponding to the amount of the electric charge accumulated in the capacitance section. The capacitance value of the capacitance section included in the second signal processing section 30 is greater than the capacitance value of the capacitance section included in the pixel section $P_{m,n}$. Each voltage value $V_{2,m,n}$ has a value corresponding to the intensity of light made incident on the pixel section $P_{m,n}$. Further, the second voltage value $V_{2,m,n}$ expresses with high precision the result of detection of incident light intensity even in the case that the capacitance section of the pixel section $P_{m,n}$ is saturated, that is, even in the case that the incident light intensity on the pixel section $P_{m,n}$ is comparatively high.

The data output section 40 receives the first voltage value $V_{1,m,n}$ outputted from the first signal processing section 20 and the second voltage value $V_{2,m,n}$ outputted from the second signal processing section 30, then performs predetermined processing, and thereby outputs a digital value $D_{m,n}$. Each digital value $D_{m,n}$ is a value of the result of A/D conversion of either the first voltage value $V_{1,m,n}$ or the second voltage value $V_{2,m,n}$, and indicates the intensity of light made incident on the pixel section $P_{m,n}$.

The timing control section 50 controls the operation of the photodetection section 10, the first signal processing section 20, the second signal processing section 30, and the data output section 40. The timing control section 50 generates various kinds of control signals at predetermined timings by means of a shift register circuit or the like, and then transmits these control signals to the photodetection section 10, the first signal processing section 20, the second signal processing section 30, and the data output section 40. In FIGS. 1 and 2, it should be noted that a part of wiring for transmitting the control signals is omitted.

Figure 3:
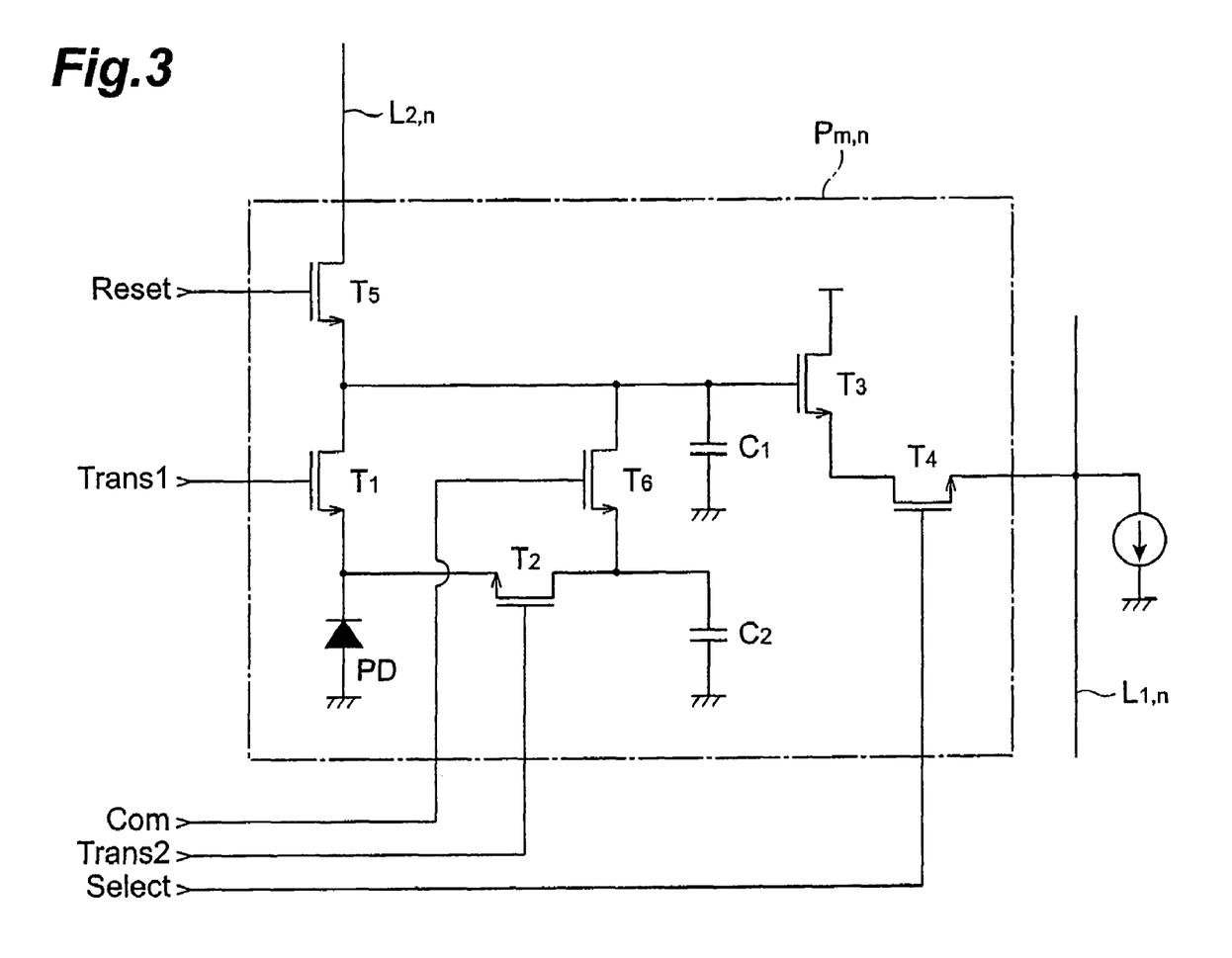
FIG. 3 is a circuit diagram of a pixel section $P_{m,n}$ included in a photodetection section 10 of FIG. 2.

FIG. 3 is a circuit diagram of a pixel section $P_{m,n}$ included in the photodetection section 10 of the photodetection apparatus 1. Each pixel section $P_{m,n}$ includes a photodiode PD, a first capacitance section $C_1$, a second capacitance section $C_2$, and transistors $T_2$-$T_6$. The photodiode PD generates electric charge of an amount corresponding to the incident light intensity. Its anode terminal is maintained at the ground potential. In each of the first capacitance section $C_1$ and the second capacitance section $C_2$, a first terminal is grounded, while the electric charge generated by the photodiode PD is accumulated. The capacitance value of the second capacitance section $C_2$ is greater than the capacitance value of the first capacitance section $C_1$, preferably by a factor of ten or greater.

The transistor $T_1$ is arranged between the cathode terminal of the photodiode PD and the second terminal of the first capacitance section $C_1$. When a Trans1 signal inputted to the gate terminal is at a high level, the resistance between the source terminal and the drain terminal goes low so that the transistor $T_1$ serves as first transfer means for transferring the electric charge generated by the photodiode PD to the first capacitance section $C_1$. Further, the transistor $T_2$ is arranged between the cathode terminal of the photodiode PD and the second terminal of the second capacitance section $C_2$. When a Trans2 signal inputted to the gate terminal is at a high level, the resistance between the source terminal and the drain terminal goes low so that the transistor $T_2$ serves as second transfer means for transferring the electric charge generated by the photodiode PD to the second capacitance section $C_2$.

In the amplification transistor $T_3$, the gate terminal is connected to the first capacitance section $C_1$, so that a voltage value is outputted that corresponds to the amount of the electric charge accumulated in the first capacitance section $C_1$. Here, the first capacitance section $C_1$ may be a parasitic capacitance section formed in the gate terminal of the amplification transistor $T_3$, or alternatively may be a capacitance section fabricated intentionally. The transistor $T_4$ is provided between the amplification transistor $T_3$ and the wiring $L_{1,n}$. When a Select signal inputted to the gate terminal is at a high level, the resistance between the source terminal and the drain terminal goes low so that the transistor $T_4$ serves as first output means for selectively outputting to the wiring $L_{1,n}$ the voltage value outputted from the amplification transistor $T_3$. A constant current source is connected to the wiring $L_{1,n}$. The transistors $T_3$ and $T_4$ constitute a source follower circuit.

The transistor $T_5$ is arranged between the first capacitance section $C_1$ and the wiring $L_{2,n}$. When a Reset signal inputted to the gate terminal is at a high level, the resistance between the source terminal and the drain terminal goes low. Further, the transistor $T_6$ is arranged between the first capacitance section $C_1$ and the second capacitance section $C_2$. When a Com signal inputted to the gate terminal is at a high level, the resistance between the source terminal and the drain terminal goes low. These transistors $T_5$ and $T_6$ serve as second output means for selectively outputting to the wiring $L_{2,n}$ the electric charge accumulated in each of the first capacitance section $C_1$ and the second capacitance section $C_2$, and also serve as initializing means for initializing the electric charge of each of the first capacitance section $C_1$ and the second capacitance section $C_2$. The second output means and the initializing means described here are connected to the second signal processing section 30 via a common terminal.

In each pixel section $P_{m,n}$ having the above-mentioned configuration, in the case that the Trans1 signal is at a low level and that the Reset signal and the Com signal are at a high level, when a bias potential is inputted from the wiring $L_{2,n}$ to the transistor $T_5$, the electric charge of each of the first capacitance section $C_1$ and the second capacitance section $C_2$ is initialized. When the Select signal is at a high level, a voltage value (dark signal component) corresponding to the initialization state is outputted from the amplification transistor $T_3$ via the transistor $T_4$ to the wiring $L_{1,n}$.

On the other hand, in the case that the Reset signal is at a low level and that the Trans1 signal is at a high level, the electric charge generated by the photodiode PD is accumulated in the first capacitance section $C_1$. Further, in the case that the Reset signal is at a low level and that the Trans2 signal is at a high level, the electric charge generated by the photodiode PD is accumulated in the second capacitance section $C_2$. Then, when the Select signal is at a high level, a voltage value corresponding to the amount of the accumulated charge in the first capacitance section $C_1$ (bright signal component) is outputted from the amplification transistor $T_3$ via the transistor $T_4$ to the wiring $L_{1,n}$. Further, when the Reset signal and the Com signal go to a high level, the electric charge accumulated in the first capacitance section $C_1$ is outputted to the wiring $L_{2,n}$ via the transistor $T_5$, while the electric charge accumulated in the second capacitance section $C_2$ is outputted to the wiring $L_{2,n}$ via the transistors $T_5$ and $T_6$.

Here, the Trans1 signal, the Trans2 signal, the Select signal, the Reset signal, and the Com signal are outputted from the timing control section 50.

Figure 4:
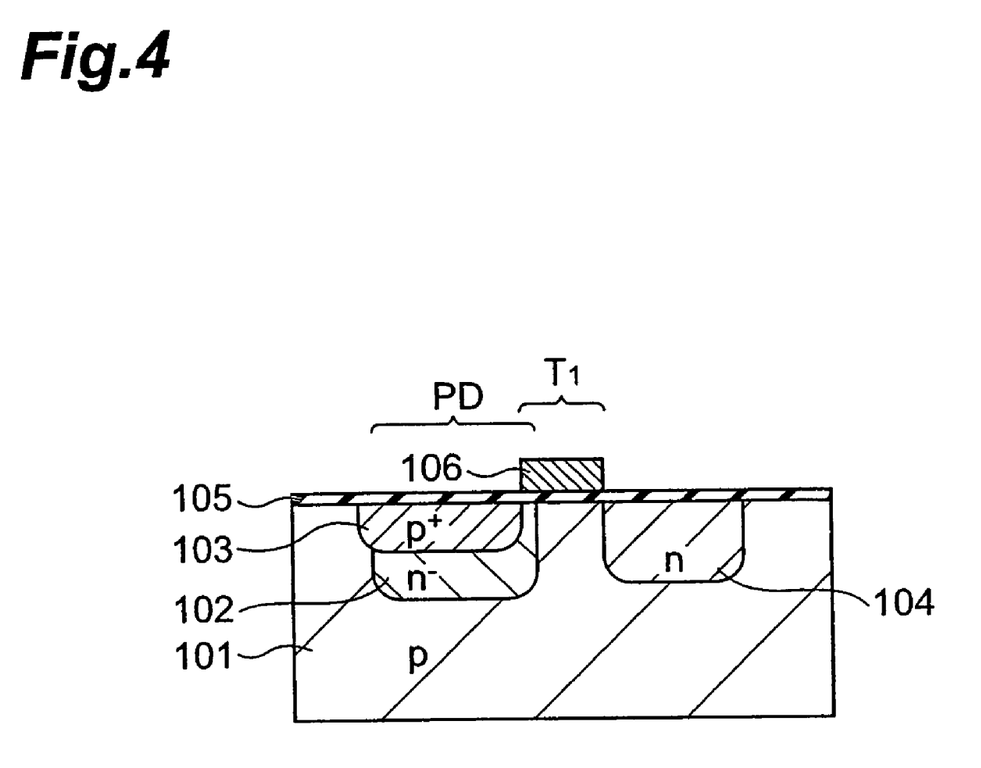
FIG. 4 is a sectional view of a photodiode PD included in a pixel section $P_{m,n}$.

FIG. 4 is a sectional view of a photodiode PD included in the pixel section $P_{m,n}$. A buried type is preferable for the photodiode PD as shown in the figure. The photodiode PD includes: a p region 101; an n⁻ region 102 on the p region 101; and a p⁺ region 103 on the n⁻ region 102. The p region 101 and the n⁻ region 102 form a pn junction, while the n⁻ region 102 and the p⁺ region 103 also form a pn junction. Further, a part of the n⁻ region 102 reaches the surface of the semiconductor layer.

The transistor $T_1$ is formed by: an n region 104 on the p region 101; the above-mentioned part of the n⁻ region 102 that reaches the surface of the semiconductor layer; and a gate electrode 106 formed between these regions on an insulating layer 105. The n region 104 is electrically connected to the gate terminal of the amplification transistor $T_3$, and electrically connected to the source terminal of the transistor $T_5$. The p region 101 and the n region 104 form a pn junction, and constitute the first capacitance section $C_1$ for accumulating the electric charge generated by the photodiode PD in the pixel section $P_{m,n}$.

When the photodiode PD is of a buried type as described here, the occurrence of a leakage current is suppressed in the surface. Further, when the reverse bias voltage of the photodiode PD is increased in the duration that the electric charge generated by the photodiode PD is transferred to the first capacitance section $C_1$, the depletion layer in the pn junction section of the photodiode PD can become complete so that the junction capacitance value of the photodiode PD can become almost zero. Thus, the electric charge generated by the photodiode PD can almost completely be transferred to the first capacitance section $C_1$. Accordingly, the use of a buried type photodiode PD is effective in the improving of the S/N ratio and the sensitivity in the photodetection.

Figure 5:
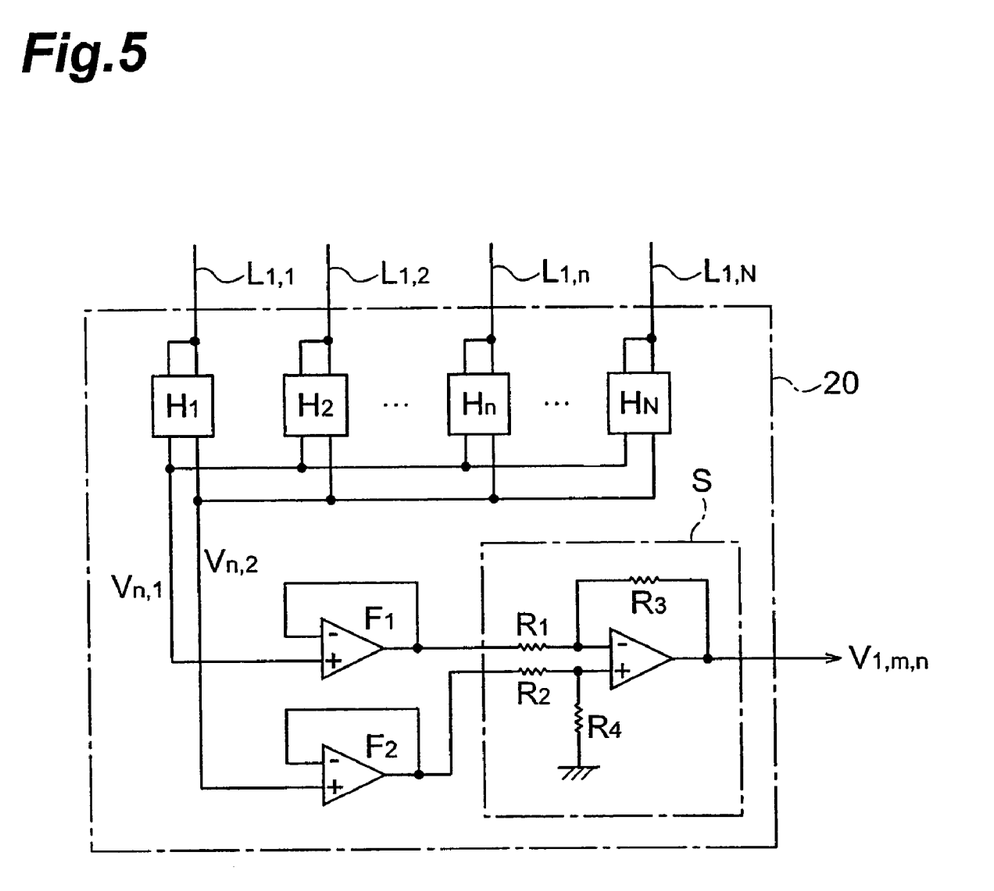
FIG. 5 is a configuration diagram of a first signal processing section 20 of a photodetection apparatus 1 of FIG. 1.

FIG. 5 is a configuration diagram of a first signal processing section 20 of the photodetection apparatus 1 according to the present embodiment. The first signal processing section 20 includes N voltage hold sections $H_1$-$H_N$, two voltage follower circuits $F_1$ and $F_2$, and a subtraction circuit S. Each voltage hold section $H_n$ has a common configuration, and is connected to the wiring $L_{1,n}$. Then, each voltage hold section $H_n$ receives the voltage value outputted to the wiring $L_{1,n}$ from each of the M pixel sections $P_{1,n}$-$P_{M,n}$ in the n-th column, thereby can hold the voltage value, and can output the held voltage value. Each of the N voltage hold sections $H_1$-$H_N$ outputs the voltage value sequentially. The voltage values held and outputted by each voltage hold section $H_n$ are two voltage values $V_{n,1}$ and $V_{n,2}$ each outputted from the pixel section $P_{m,n}$ at a mutually distinct time.

Each of the two voltage follower circuits $F_1$ and $F_2$ has a common configuration. That is, the inverting input terminal and the output terminal of the amplifier are connected directly to each other, while each voltage follower circuit has a high input impedance and a low output impedance and is ideally composed of a unity gain amplifier. In the one voltage follower circuit $F_1$, one voltage value $V_{n,1}$ sequentially outputted from each of the N voltage hold sections $H_1$-$H_N$ is inputted to the non-inverting input terminal. In the other voltage follower circuit $F_2$, the other voltage value $V_{n,2}$ sequentially outputted from each of the N voltage hold sections $H_1$-$H_N$ is inputted to the non-inverting input terminal.

The subtraction circuit S includes an amplifier and four resistors $R_1$-$R_4$. The inverting input terminal of the amplifier is connected to the output terminal of the voltage follower circuit $F_2$ via the resistor $R_1$, and then connected to the own output terminal via the resistor $R_3$. The non-inverting input terminal of the amplifier is connected to the output terminal of the voltage follower circuit $F_2$ via the resistor $R_2$, and then connected to the ground potential via the resistor $R_4$. When each of the voltage follower circuits $F_1$ and $F_2$ has a unity gain while the four resistors $R_1$-$R_4$ have the same resistance value with each other, the first voltage value $V_{1,m,n}$ outputted from the output terminal of the subtraction circuit S is expressed by the formula $$V_{1,m,n} = V_{n,2} - V_{n,1}.$$

Figure 6:
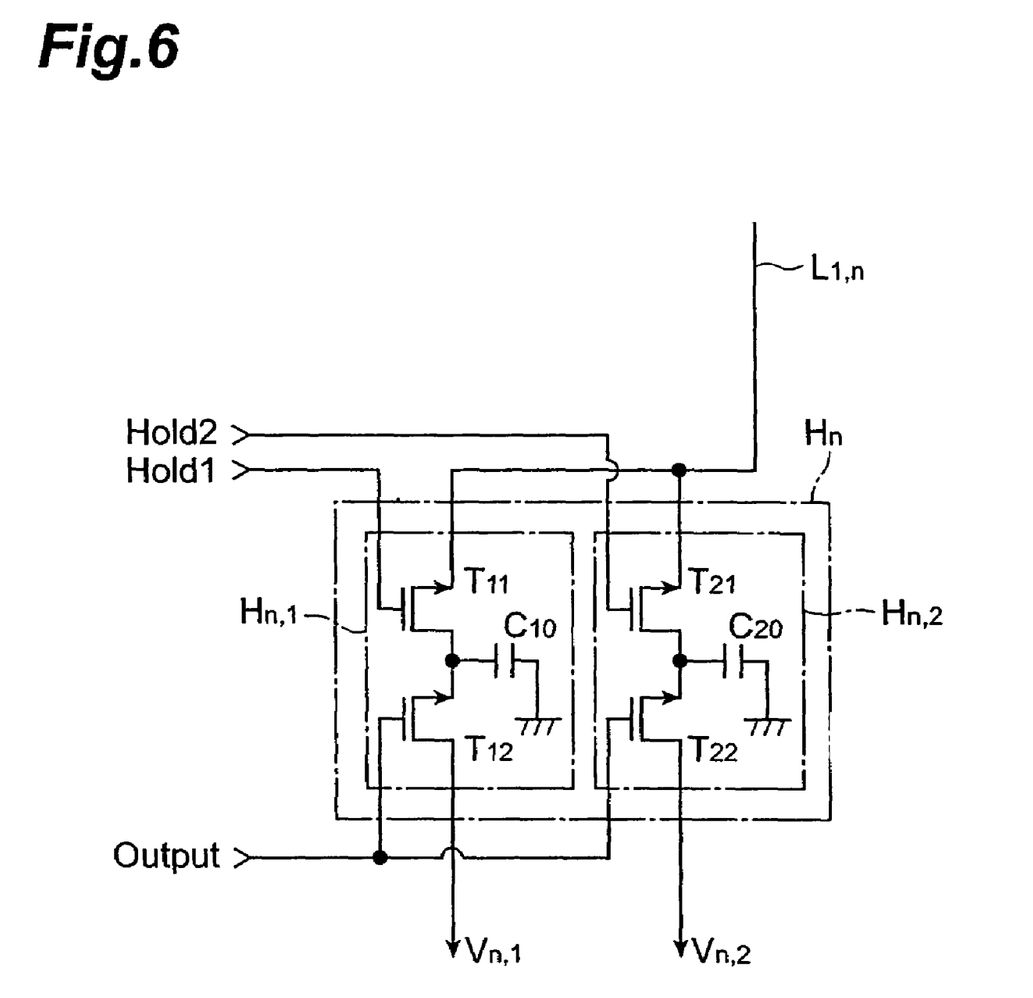
FIG. 6 is a circuit diagram of a voltage hold section $H_n$ included in a first signal processing section 20 of FIG. 5.

FIG. 6 is a circuit diagram of a voltage hold section $H_n$ included in the first signal processing section 20 of the photodetection apparatus 1. Each voltage hold section $H_n$ includes a first hold section $H_{n,1}$ and a second hold section $H_{n,2}$. The first hold section $H_{n,1}$ and the second hold section $H_{n,2}$ have the same configuration as each other. Each hold section receives the voltage value sequentially outputted from the transistor $T_4$ of each of the M pixel sections $P_{1,n}$-$P_{M,n}$ in the n-th column, and can thereby hold the voltage value, and output the held voltage value.

The first hold section $H_{n,1}$ includes a transistor $T_{11}$, a transistor $T_{12}$, and a capacitance element $C_{10}$. One end of the capacitance element $C_{10}$ is maintained at the ground potential, while the other end of the capacitance element $C_{10}$ is connected to the drain terminal of the transistor $T_{11}$, and the source terminal of the transistor $T_{12}$. The source terminal of the transistor $T_{11}$ is connected to the transistor $T_4$ of the pixel section $P_{m,n}$ via the wiring n. The drain terminal of the transistor $T_{12}$ is connected to the voltage follower circuit $F_1$. In the first hold section $H_{n,1}$ having the configuration described here, when the Hold1 signal inputted to the gate terminal of the transistor $T_{11}$ is at a high level, the voltage value outputted from the pixel section $P_{m,n}$ connected via the wiring $L_{1,n}$ is held by the capacitance element $C_{10}$. Then, when the Output signal inputted to the gate terminal of the transistor $T_{12}$ is at a high level, the voltage value $V_{n,1}$ held by the capacitance element $C_{10}$ is outputted to the voltage follower circuit $F_1$.

The second hold section $H_{n,2}$ includes a transistor $T_{21}$, a transistor $T_{22}$, and a capacitance element $C_{20}$. One end of the capacitance element $C_{20}$ is maintained at the ground potential, while the other end of the capacitance element $C_{20}$ is connected to the drain terminal of the transistor $T_{21}$ and the source terminal of the transistor $T_{22}$. The source terminal of the transistor $T_{21}$ is connected to the transistor $T_4$ of the pixel section $P_{m,n}$ via the wiring $L_{1,n}$. The drain terminal of the transistor $T_{22}$ is connected to the voltage follower circuit $F_2$. In the second hold section $H_{n,2}$ having the configuration described here, when the Hold2 signal inputted to the gate terminal of the transistor $T_{21}$ is at a high level, the voltage value outputted from the pixel section $P_{m,n}$ connected via the wiring $L_{1,n}$ is held by the capacitance element $C_{20}$. Then, when the Output signal inputted to the gate terminal of the transistor $T_{22}$ is at a high level, the voltage value $V_{n,2}$ held by the capacitance element $C_{20}$ is outputted to the voltage follower circuit $F_2$.

Each of the first hold section $H_{n,1}$ and the second hold section $H_{n,2}$ operates in a distinct timing with each other. For example, in the pixel section $P_{m,n}$ connected via the wiring $L_{1,n}$ in the case when the Trans1 signal is at a low level and that the Reset signal and the Select signal are at a high level, the first hold section $H_{n,1}$ holds the received voltage value (dark signal component) $V_{n,1}$ outputted from the amplification transistor $T_3$. On the other hand, in the pixel section $P_{m,n}$ connected via the wiring $L_{1,n}$ in the case when the Reset signal is at a low level and that the Trans1 signal and the Select signal are at a high level, the second hold section $H_{n,2}$ holds the received voltage value (bright signal component) $V_{n,2}$ outputted from the amplification transistor $T_3$. Here, the Hold1 signal, the Hold2 signal, and the Output signal are outputted from the timing control section 50.

Figure 7:
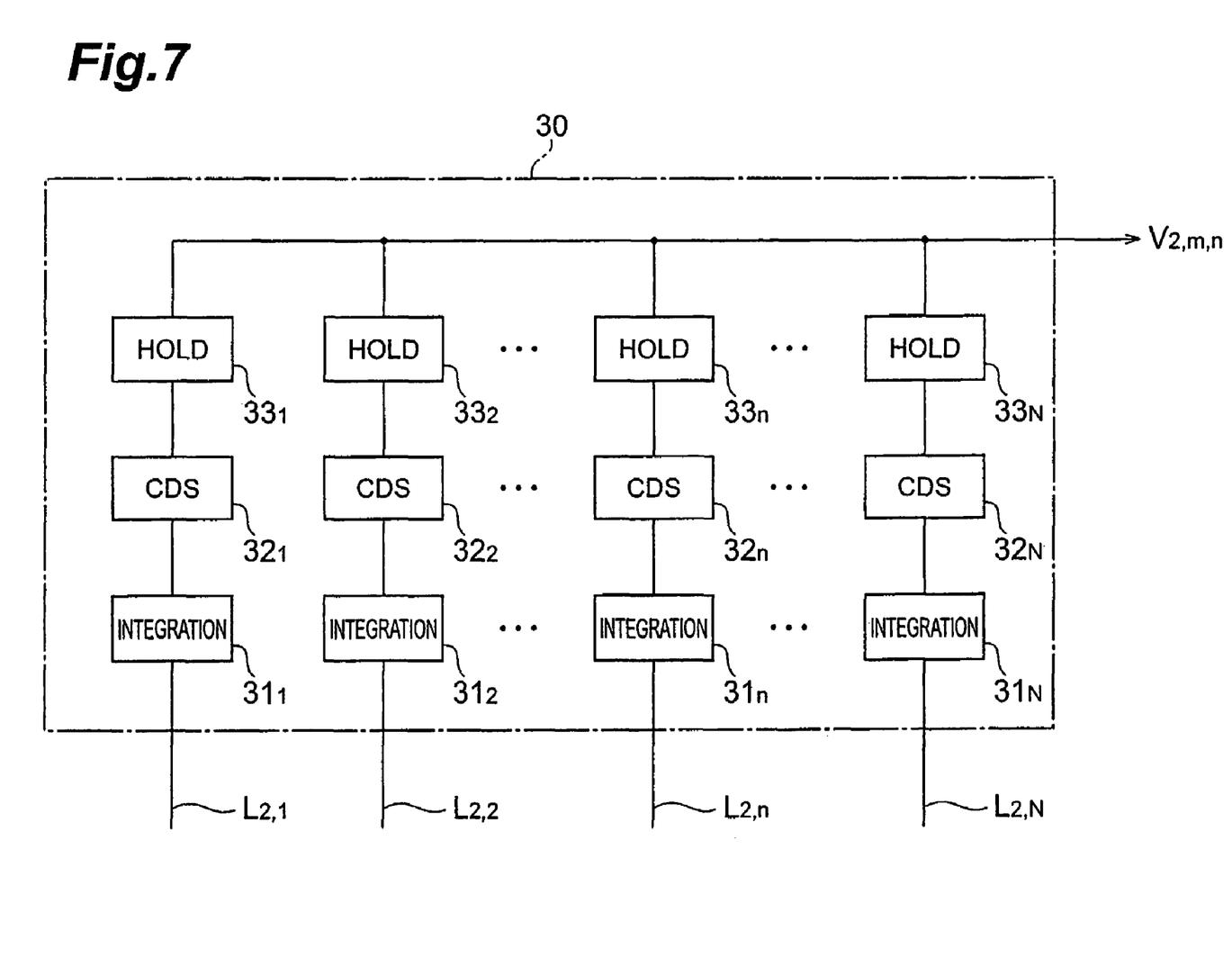
FIG. 7 is a configuration diagram of a second signal processing section 30 of a photodetection apparatus 1 of FIG. 1.

FIG. 7 is a configuration diagram of a second signal processing section 30 of the photodetection apparatus 1. The second signal processing section 30 includes N integration circuits $31_1$-$31_N$, N CDS (Correlated Double Sampling) circuits $32_1$-$32_N$, and N hold circuits $33_1$-$33_N$. The integration circuits $31_n$ have a common configuration, and are connected to the wiring $L_{2,n}$. Then, each integration circuit $31_n$ receives the electric charge outputted from each of the M pixel sections $P_{1,n}$-$P_{M,n}$ in the n-th column to the wiring $L_{2,n}$, thereby accumulates the electric charge, and then outputs a voltage value corresponding to the amount of the accumulated charge. The CDS circuits $32_n$ have a common configuration. Then, each CDS circuit $32_n$ receives the voltage value outputted from the integration circuit $31_n$, and thereby outputs a voltage value corresponding to the difference in the input voltage values at a specific time and another time. The hold circuits $33_n$ have a common configuration. Then, each hold circuit $33_n$ receives the voltage value outputted from the CDS circuit $32_n$, thereby holds the voltage value, and then outputs the held voltage value $V_{2,m,n}$.

Figure 8:
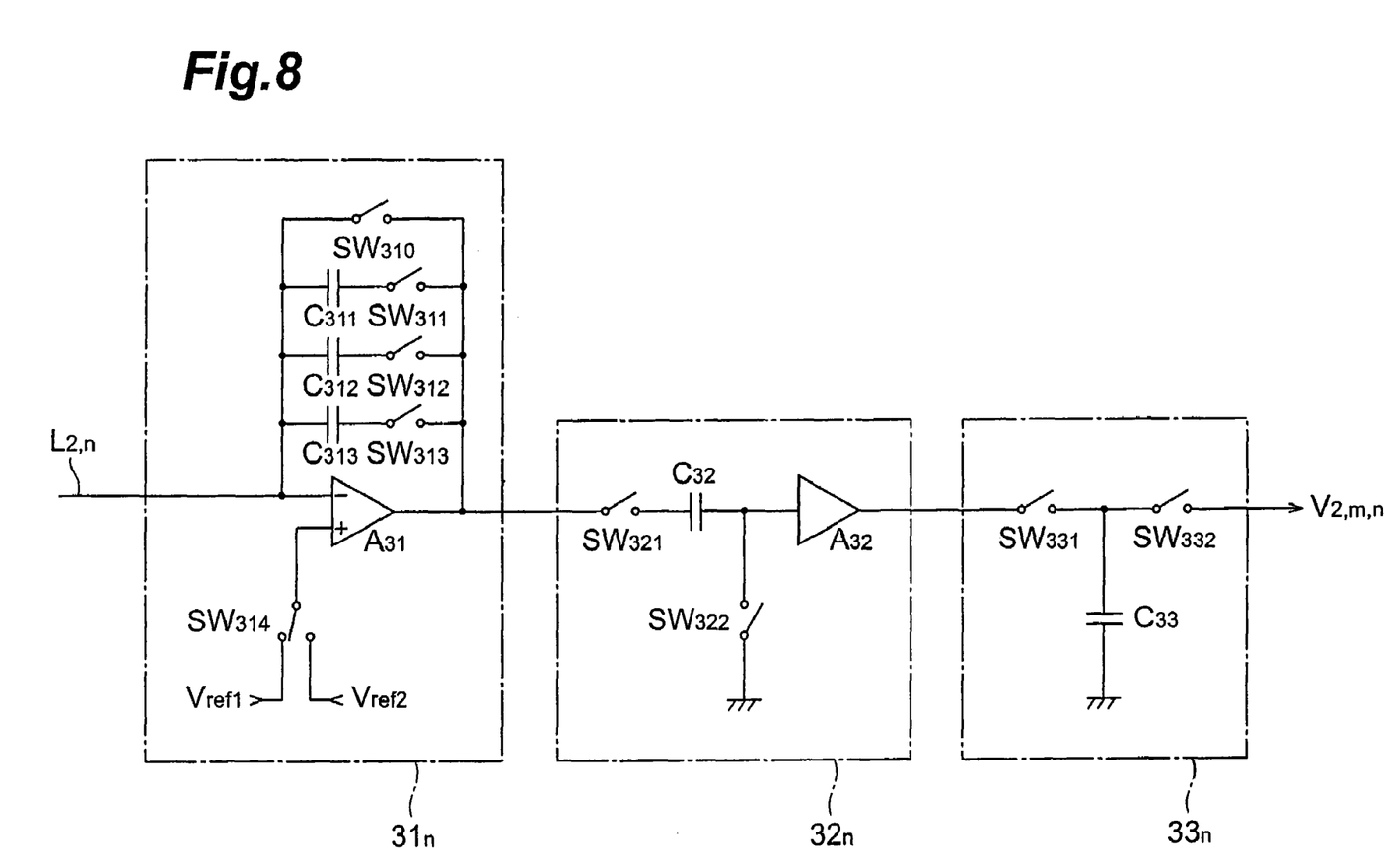
FIG. 8 is a circuit diagram of an integration circuit $31_n$, a CDS circuit $32_n$, and a hold circuit $33_n$ included in a second signal processing section 30 of FIG. 7.

FIG. 8 is a circuit diagram of an integration circuit $31_n$, a CDS circuit $32_n$, and a hold circuit $33_n$ included in the second signal processing section 30.

Each integration circuit $31_n$ includes an amplifier $A_{31}$, capacitance elements $C_{311}$-$C_{313}$, and switches $SW_{310}$-$SW_{314}$. Either a reference voltage $V_{ref1}$ or a reference voltage $V_{ref2}$ is applied to the non-inverting input terminal of the amplifier $A_{31}$ via the switch $SW_{314}$. The reference voltage $V_{ref2}$ is higher than the reference voltage $V_{ref1}$. For example, the reference voltage $V_{ref1}$ is approximately 1.5V, while the reference voltage $V_{ref2}$ is approximately 3V. The inverting input terminal of the amplifier $A_{31}$ is connected to the wiring $L_{2,n}$, and thereby receives the electric charge outputted from each of the M pixel sections $P_{1,n}$-$P_{M,n}$ in the n-th column to the wiring $L_{2,n}$.

Between the inverting input terminal and the output terminal of the amplifier $A_{31}$, arranged in parallel to each other are: the switch $SW_{310}$; the capacitance element $C_{311}$, and the switch $SW_{311}$ interconnected in series; the capacitance element $C_{312}$ and the switch $SW_{312}$ interconnected in series; and the capacitance element $C_{313}$ and the switch $SW_{313}$ interconnected in series. The capacitance elements $C_{311}$-$C_{313}$ and the switches $SW_{311}$-$SW_{313}$ constitute a feedback capacitance section having a variable capacitance value. That is, the feedback capacitance section constructed from these components is connected between the inverting input terminal and the output terminal of the amplifier $A_{31}$, and has a distinct capacitance value depending on the open/close states of the switches $SW_{311}$-$SW_{313}$.

The capacitance value of each of the capacitance elements $C_{311}$-$C_{313}$ is greater than the capacitance value of the first capacitance section $C_1$ included in the pixel section $P_{m,n}$. The maximum capacitance value of the feedback capacitance section is in the order of or greater than the sum of the capacitance values of the first capacitance section $C_1$ and the second capacitance section $C_2$ included in the pixel section $P_{m,n}$. Although the maximum capacitance value of the feedback capacitance section depends also on the mode of switching operation of each of the switches $SW_{311}$-$SW_{313}$, when the switches $SW_{311}$-$SW_{313}$ are closed simultaneously, the maximum capacitance value of the feedback capacitance section is the total of the capacitance values of the capacitance elements $C_{311}$-$C_{313}$. When any one of the switches $SW_{311}$-$SW_{313}$ is solely closed, the maximum capacitance value of the feedback capacitance section equals the maximum capacitance value among the capacitance elements $C_{311}$-$C_{313}$.

In the integration circuit $31_n$, in the case that the switches $SW_{311}$-$SW_{313}$ are closed, when the switch $SW_{310}$ is also closed, the capacitance elements $C_{311}$-$C_{313}$ are discharged so that the voltage value outputted from the output terminal of the amplifier $A_{31}$ is initialized. When the switch $SW_{310}$ is open, the electric charge inputted through the wiring $L_{2,n}$ is accumulated in the feedback capacitance section, so that a voltage value corresponding to the amount of the accumulated charge and the capacitance value of the feedback capacitance section is outputted from the output terminal of the amplifier $A_{31}$.

Each CDS circuit $32_n$ includes an amplifier $A_{32}$, a capacitance element $C_{32}$, and switches $SW_{321}$, and $SW_{322}$. One end of the capacitance element $C_{32}$ is connected via the switch $SW_{321}$ to the output terminal of the amplifier $A_{31}$ of the integration circuit $31_n$. The other end of the capacitance element $C_{32}$ is connected to the input terminal of the amplifier $A_{32}$, and connected to the ground potential via the switch $SW_{322}$. In this CDS circuit $32_n$, at a first time, the switch $SW_{322}$ goes from the closed state to the open state. After that, at a second time, the switch $SW_{321}$ goes from the closed state to the open state. By virtue of this, a voltage value corresponding to the difference in the voltage values outputted from the integration circuit $31_n$ at the first time and the second time is outputted from the output terminal of the amplifier $A_{32}$.

Each hold circuit $33_n$ includes a capacitance element $C_{33}$ and switches $SW_{331}$ and $SW_{332}$. One end of the switch $SW_{331}$ is connected to the output terminal of the amplifier $A_{32}$ of the CDS circuit $32_n$. One end of the switch $SW_{332}$ is connected to the output terminal of the hold circuit $33_n$. The other end of the switch $SW_{331}$ and the other end of the switch $SW_{332}$ are connected to each other. This junction point is connected to the ground potential via the capacitance element $C_{33}$. In this hold circuit $33_n$, when the switch $SW_{331}$ is closed, the voltage value outputted from the CDS circuit $32_n$ is held by the capacitance element $C_{33}$. Then, when the switch $SW_{332}$ is closed, the voltage value held by the capacitance element $C_{33}$ is outputted as the second voltage value $V_{2,m,n}$.

The switches $SW_{310}$-$SW_{314}$ of each integration circuit $31_n$, the switches $SW_{321}$ and $SW_{322}$ of each CDS circuit $32_n$, and the switches $SW_{331}$ and $SW_{332}$ of each hold circuit $33_n$ perform open/close operation on the basis of the control signals outputted from the timing control section 50.

Figure 9:
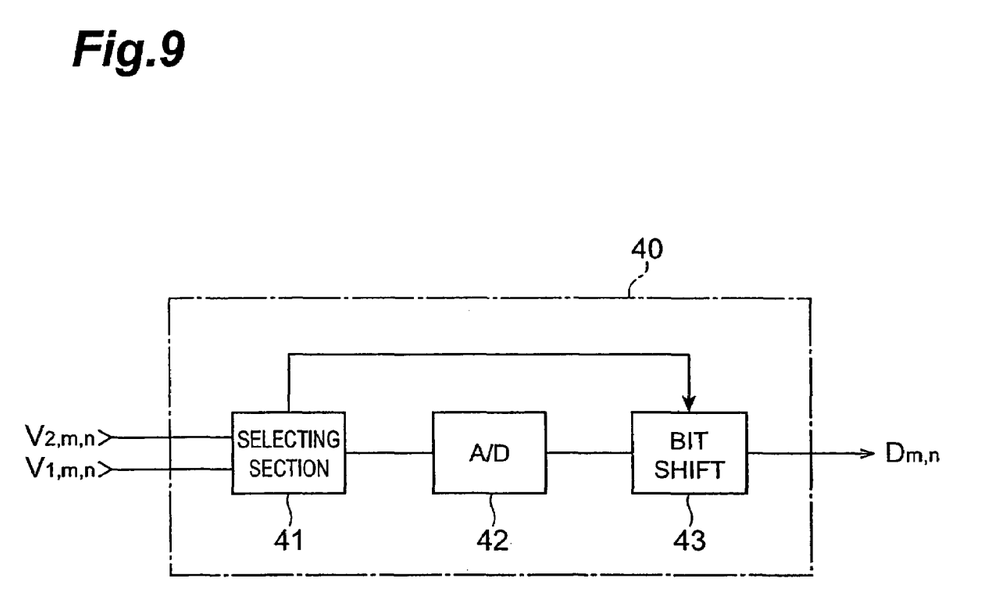
FIG. 9 is a configuration diagram of a data output section 40 of a photodetection apparatus 1 of FIG. 1.

FIG. 9 is a configuration diagram of a data output section 40 of the photodetection apparatus 1. The data output section 40 includes a selecting section 41, an A/D conversion section 42, and a bit shift section 43.

The selecting section 41 receives the first voltage value $V_{1,m,n}$ outputted from the first signal processing section 20 and the second voltage value $V_{2,m,n}$ outputted from the second signal processing section 30, and then on the basis of the result of comparison of the first voltage value $V_{1,m,n}$ with a reference value, selects and outputs any one of the voltage values consisting of the first voltage value $V_{1,m,n}$ and the second voltage value $V_{2,m,n}$.

Specifically, the reference value is set to be the saturation value of the first voltage value outputted from the first signal processing section 20, or alternatively to be a value slightly smaller than this value. That is, when the first voltage value $V_{1,m,n}$ is compared with the reference value, it is determined whether the first capacitance section $C_1$ of the pixel section $P_{m,n}$ is saturated. Then, when the first voltage value $V_{1,m,n}$ is smaller than the reference value, the selecting section 41 outputs the first voltage value $V_{1,m,n}$. On the contrary, when the first voltage value $V_{1,m,n}$ is greater than or equal to the reference value, the selecting section 41 outputs the second voltage value $V_{2,m,n}$.

Here, in place of the comparison of the first voltage value $V_{1,m,n}$ with the reference value, the second voltage value $V_{2,m,n}$ may be compared with the reference value. Also in this case, the reference value is set to be a value that permits the determination as to whether the first capacitance section $C_1$ of the pixel section $P_{m,n}$ is saturated.

The A/D conversion section 42 receives the voltage value outputted from the selecting section 41, then performs A/D conversion on this signal, and then outputs a digital value corresponding to the voltage value.

The bit shift section 43 receives the digital value outputted from the A/D conversion section 42, and then shifts the bit of the inputted digital value by a necessary number of bits depending on which value has been selected from the first voltage value $V_{1,m,n}$ and the second voltage value $V_{2,m,n}$ in the selecting section 41. Then, the bit shift section 43 outputs the value. Specifically, in the case that the capacitance value of the feedback capacitance section of each integration circuit $31_n$ is assumed to be $2^K$ times (K is an integer greater than or equal to 1) the capacitance value of the first capacitance section $C_1$ included in the pixel section $P_{m,n}$, when the first voltage value $V_{1,m,n}$ is selected in the selecting section 41, the bit shift section 43 outputs the inputted digital value intact as an output digital value $D_{m,n}$. In contrast, when the second voltage value $V_{2,m,n}$ is selected in the selecting section 41, the bit shift section 43 outputs as an output digital value $D_{m,n}$ a value generated by shifting the inputted digital value upward by K bits. The output digital value $D_{m,n}$ may be parallel data, or alternatively may be serial data.

As such, when the first capacitance section $C_1$ of the pixel section $P_{m,n}$ is not saturated, that is, when the intensity of the light made incident on the pixel section $P_{m,n}$ is comparatively low, a voltage value corresponding to the amount of the accumulated charge in the first capacitance section $C_1$ of the pixel section $P_{m,n}$ is outputted to the wiring $L_{1,n}$ by the first output means (transistor $T_4$), so that the first voltage value $V_{1,m,n}$ corresponding to the voltage value is outputted from the first signal processing section 20. Then, the A/D conversion result of the first voltage value $V_{1,m,n}$ is outputted as the digital value $D_{m,n}$ from the data output section 40. This permits photodetection with high sensitivity.

In contrast, when the first capacitance section $C_1$ of the pixel section $P_{m,n}$ is saturated (or almost saturated), that is, when the intensity of the light made incident on the pixel section $P_{m,n}$ is comparatively high, the electric charge accumulated temporarily in the first capacitance section $C_1$ and the second capacitance section $C_2$ of the pixel section $P_{m,n}$ is outputted to the wiring $L_{2,n}$ by the second output means (transistors $T_5$ and $T_6$), so that the second voltage value $V_{2,m,n}$ corresponding to the electric charge amount is outputted from the second signal processing section 30. Then, the A/D conversion result of the second voltage value $V_{2,m,n}$ is outputted as the digital value $D_{m,n}$ from the data output section 40. This permits photodetection with a wide dynamic range.

Thus, the photodetection apparatus 1 according to the present embodiment can perform image pick-up with high sensitivity and a wide dynamic range.

Moreover, in the photodetection apparatus 1, each pixel section $P_{m,n}$ further includes third output means for selectively outputting the electric charge generated by the photodiode PD via a route not passing through the first capacitance section $C_1$ and the second capacitance section $C_2$. Furthermore, a third signal processing section is further provided that reads the electric charge amount outputted by the third output means of each pixel section $P_{m,n}$ and thereby outputs a third voltage value $V_{3,m,n}$ corresponding to the electric charge amount. Here, the third signal processing section may be provided separately from the second signal processing section 30. However, the third signal processing section may have a configuration similar to that of the second signal processing section 30. Thus, the second signal processing section 30 may also serve as the third signal processing section. However, when the second signal processing section 30 also serves as the third signal processing section, the second signal processing section 30 includes another hold circuit for holding and outputting the third voltage value $V_{3,m,n}$ in addition to the hold circuit $33_n$ for holding and outputting the second voltage value $V_{2,m,n}$.

Further, when the third output means and the third signal processing section are provided, the selecting section 41 of the data output section 40 receives the first voltage value $V_{1,m,n}$ outputted from the first signal processing section 20, the second voltage value $V_{2,m,n}$ outputted from the second signal processing section 30, and the third voltage value $V_{3,m,n}$ outputted from the third signal processing section (second signal processing section 30 in the case of shared configuration), and then selects and outputs any one of these voltage values consisting of the first voltage value $V_{1,m,n}$, the second voltage value $V_{2,m,n}$, and the third voltage value $V_{3,m,n}$. After that, the bit shift section 43 receives the digital value outputted from the A/D conversion section 42, and then shifts the bit of the inputted digital value by a necessary number of bits depending on which value has been selected from the first voltage value $V_{1,m,n}$, the second voltage value $V_{2,m,n}$, and the third voltage value $V_{3,m,n}$ in the selecting section 41. Then, the bit shift section 43 outputs the value.

When the third voltage value $V_{3,m,n}$ is selected in the selecting section 41, a digital value $D_{m,n}$ indicating the incident light intensity is outputted from the data output section 40 even when the intensity of the light made incident on the pixel section $P_{m,n}$ is still greater than the case when the second voltage value $V_{2,m,n}$ is selected. This permits photodetection with a much wider dynamic range.

Figure 10:
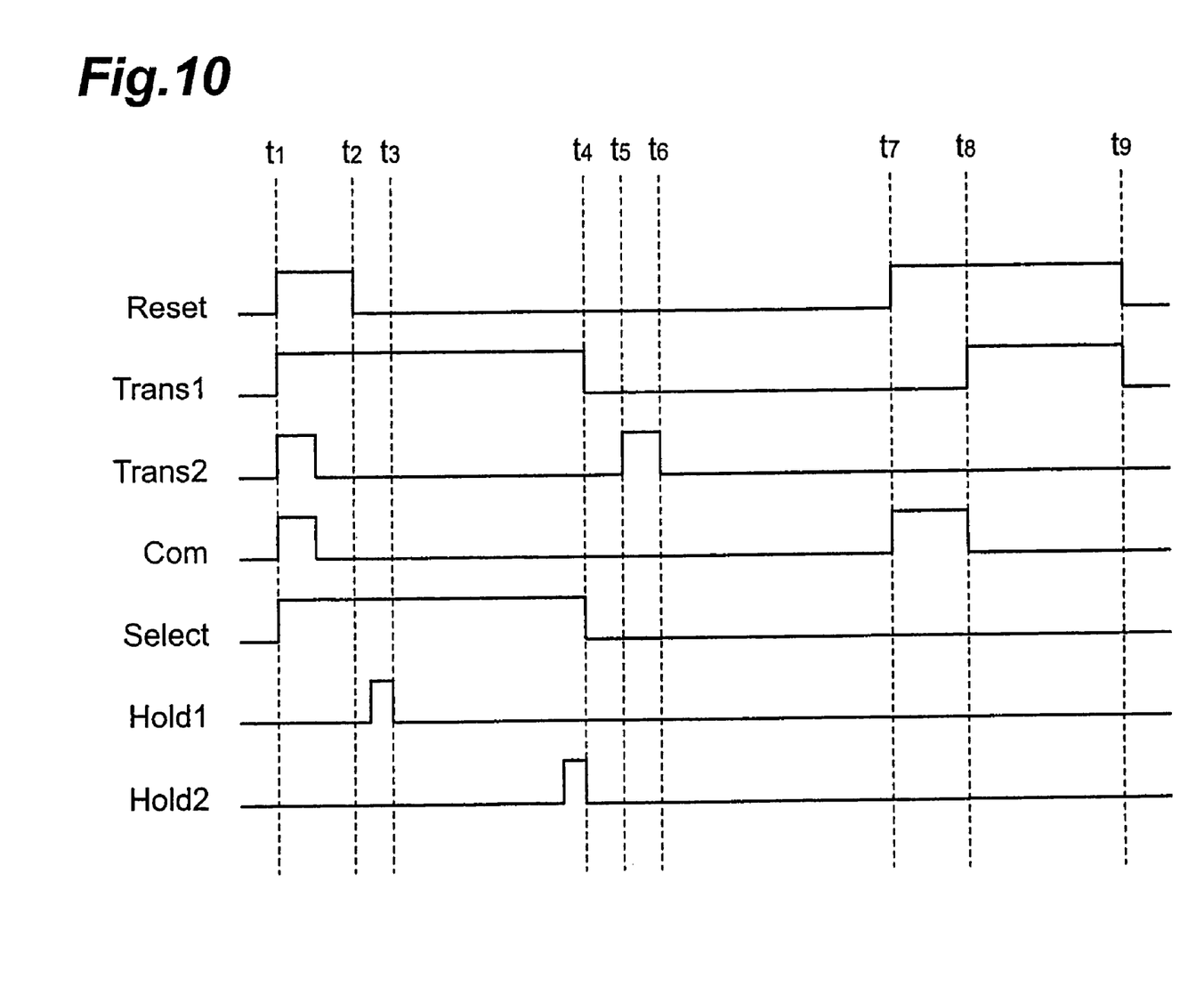
FIG. 10 is a timing chart describing an example of operation of a photodetection apparatus 1 of FIG. 1.

Next, an example of operation of the photodetection apparatus 1 is described below. FIG. 10 is a timing chart describing an example of operation of the photodetection apparatus 1. The operation of the photodetection apparatus 1 described below is performed under the control of various kinds of control signals outputted from the timing control section 50.

This figure shows the time-dependent change of the levels of: the Reset signal inputted to the gate terminal of the transistor $T_5$ of each pixel section $P_{m,n}$; the Trans1 signal inputted to the gate terminal of the transistor $T_1$ of each pixel section $P_{m,n}$; the Trans2 signal inputted to the gate terminal of the transistor $T_2$ of each pixel section $P_{m,n}$; the Com signal inputted to the gate terminal of the transistor $T_6$ of each pixel section $P_{m,n}$; the Select signal inputted to the gate terminal of the transistor $T_4$ of each pixel section $P_{m,n}$; the Hold1 signal inputted to the gate terminal of the transistor $T_{11}$ of each voltage hold section $H_n$; and the Hold2 signal inputted to the gate terminal of the transistor $T_{21}$ of each voltage hold section $H_n$; in descending order. Further, this figure shows the operation of the N pixel sections $P_{m,1}$-$P_{m,N}$ of the m-th row among the M×N pixel sections $P_{m,n}$ included in the photodetection section 10.

Before time $t_1$, the Reset signal, the Trans1 signal, the Trans2 signal, the Com signal, the Select signal, the Hold1 signal, and the Hold2 signal are at a low level. At time $t_1$, the Reset signal, the Trans1 signal, the Trans2 signal, the Com signal, and the Select signal go to a high level. Further, in the integration circuit 31$_n$, the reference voltage $V_{ref2}$ (for example, 3V) is inputted to the non-inverting input terminal of the amplifier $A_{31}$ as a result of the operation of the switch $SW_{314}$. As a result, the first capacitance section $C_1$ and the second capacitance section $C_2$ of each pixel section $P_{m,n}$ are discharged. After that, at time $t_2$, the Reset signal goes to a low level. Further, before time $t_2$, the Trans2 signal and the Com signal go to a low level.

Immediately after time $t_2$, the Hold1 signal temporarily goes to a high level, while at time $t_3$, the Hold1 signal goes to a low level. After time $t_3$, the Hold2 signal temporarily goes to a high level, while at time $t_4$ where a predetermined time has elapsed from time $t_2$, the Hold2 signal goes to a low level. Further, at time $t_4$, the Select signal goes to a low level. As a result, the voltage value (dark signal component) $V_{n,1}$, outputted from the transistor $T_4$ of each pixel section $P_{m,n}$ to the wiring $L_{1,n}$ at time $t_3$ is held after the time $t_3$ by the capacitance element $C_{11}$ of the first hold section $H_{n,1}$ of the voltage hold section $H_n$. Further, in each pixel section $P_{m,n}$, the electric charge generated by the photodiode PD in a predetermined duration from time $t_2$ to time $t_4$ is accumulated in the first capacitance section $C_1$. Then, the voltage value (bright signal component) $V_{n,2}$ outputted from the transistor $T_4$ of each pixel section $P_{m,n}$ to the wiring $L_{1,n}$ at time $t_4$ is held after the time $t_4$ by the capacitance element $C_{20}$ of the second hold section $H_{n,2}$ of the voltage hold section $H_n$. After that, when the Output signal inputted to each of the N voltage hold sections $H_1$-$H_N$ goes to a high level sequentially, the first voltage value $V_{1,m,n}(=V_{n,2}-V_{n,1})$ of each of the N pixel sections $P_{m,1}$-$P_{m,N}$ of the m-th row is sequentially outputted from the first signal processing section 20.

At time $t_5$ after time $t_4$, the Trans2 signal goes to a high level, while at time $t_6$ after that, the Trans2 signal goes to a low level. As a result, in each pixel section $P_{m,n}$, the electric charge generated by the photodiode PD in the duration from time $t_2$ to time $t_6$ is accumulated in both of the first capacitance section $C_1$ and the second capacitance section $C_2$.

At time $t_7$ after time $t_6$, the Reset signal and the Com signal go to a high level. At time $t_8$ after that, the Com signal goes to a low level, while the Trans1 signal goes to a high level. Further, at time $t_9$ after that, the Reset signal and the Trans1 signal go to a low level.

In the duration from time $t_7$ to time $t_8$ where the Reset signal and the Com signal are at a high level, the electric charge accumulated in both of the first capacitance section $C_1$ and the second capacitance section $C_2$ of each pixel section $P_{m,n}$ is outputted from the transistor $T_5$ to the wiring $L_{2,n}$, and then inputted to the second signal processing section 30, so that the second voltage value $V_{2,m,n}$ corresponding to the electric charge amount is outputted from the second signal processing section 30.

In the duration from time $t_8$ to time $t_9$ where the Reset signal and the Trans1 signal are high, the electric charge generated by the photodiode PD of each pixel section $P_{m,n}$ is outputted from the transistor $T_5$ to the wiring $L_{2,n}$ via a route not passing through the first capacitance section $C_1$ and the second capacitance section $C_2$, and then inputted to the second signal processing section 30, so that the third voltage value $V_{3,m,n}$, corresponding to the electric charge amount is outputted from the second signal processing section 30. At that time, the feedback capacitance section of each integration circuit 31$_n$ of the second signal processing section 30 may be set at each capacitance value sequentially so that the third voltage value $V_{3,m,n}$ may be outputted for each capacitance value.

Further, at that time, in each integration circuit 31$_n$, the reference voltage $V_{ref1}$ (for example, 1.5V) is inputted to the non-inverting input terminal of the amplifier $A_{31}$, as a result of the operation of the switch $SW_{314}$. As such, when a comparatively low reference voltage $V_{ref2}$ is inputted to the non-inverting input terminal of the amplifier $A_{31}$, the dynamic range can be enhanced in the photodetection.

Then, after time $t_9$, in the data output section 40, for each of the N pixel sections $P_{m,1}$-$P_{m,N}$ of the m-th row, any one of the voltage values consisting of the first voltage value $V_{1,m,n}$, the second voltage value $V_{2,m,n}$, and the third voltage value $V_{3,m,n}$ is selected by the selecting section 41 so that the voltage value is converted into a digital value by the A/D conversion section 42. Further, depending on which of the three voltage values has been selected, the bit of the digital value is shifted by the bit shift section 43 by a necessary number of bits, so that the digital value $D_{m,n}$ is outputted.

As such, when the processing is completed for each of the N pixel sections $P_{m,1}$-$P_{m,N}$ of the m-th row, processing is performed on each of the N pixel sections $P_{m+1,1}$-$P_{m+1,N}$ of the next (m+1)-th row. Here, in the duration after time $t_9$ where the processing is performed in the data output section 40 on each of the N pixel sections $P_{m,1}$-$P_{m,N}$ of the m-th row, processing corresponding to the above-mentioned processing performed from time $t_1$ to time $t_9$ may be performed on each of the N pixel sections $P_{m+1,1}$-$P_{m+1,N}$ of the next (m+1)-th row.

The invention is not limited to the above-mentioned embodiment, and hence various modifications are possible. In the above-mentioned embodiment, one voltage hold section $H_n$ per M pixel sections $P_{1,n}$-$P_{M,n}$ of each column has been provided in the first signal processing section 20. However, one voltage hold section per each pixel section $P_{m,n}$ may be provided in the first signal processing section 20. In the latter case, the first voltage value $V_{1,m,n}$ corresponding to the incident light intensity on each pixel section $P_{m,n}$ in the same duration can be held by the voltage hold section corresponding to the pixel section $P_{m,n}$.

Further, in the above-mentioned embodiment, one set of an integration circuit 31$_n$, a CDS circuit 32$_n$, and a hold circuit 33$_n$ per M pixel sections $P_{1,n}$-$P_{M,n}$ of each column has been provided in the second signal processing section 30. However, one set of the integration circuit, the CDS circuit, and the hold circuit per each pixel section $P_{m,n}$ may be provided in the second signal processing section 30. In the latter case, the second voltage value $V_{2,m,n}$ corresponding to the incident light intensity on each pixel section $P_{m,n}$ in the same duration can be held by the hold circuit corresponding to the pixel section $P_{m,n}$. The same situation holds for the third signal processing section.

A photodetection apparatus according to the invention is applicable to a solid state image pickup device used in an imaging device, a photometry device, a distance measuring device, or the like.

As described above, with the photocathode of the present invention, there can be accomplished an improvement in productivity thereof and an improvement in the detection sensitivity of an electron tube employing the same.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The invention claimed is:

1. A photodetection apparatus comprising:
   a pixel section comprising a photodiode for generating electric charge of an amount corresponding to incident light intensity, a first capacitance section for accumulating the electric charge generated by the photodiode, a second capacitance section having a larger charge accumulation capacitance than the first capacitance section and accumulating the electric charge generated by the photodiode, first transfer means comprising a first transistor that is coupled between the photodiode and the first capacitance section for transferring the electric charge generated by the photodiode to the first capacitance section, second transfer means comprising a second transistor that is coupled between the photodiode and the second capacitance section for transferring the electric charge generated by the photodiode to the second capacitance section, an amplification transistor having a gate terminal which is connected to the first capacitance section and which outputs a voltage value corresponding to the amount of electric charge accumulated in the first capacitance section, first output means for selectively outputting the voltage value outputted from the amplification transistor, second output means for selectively outputting the electric charge accumulated in each of the first capacitance section and the second capacitance section, and initializing means for initializing the electric charge of each of the first capacitance section and the second capacitance section to an initialization state;

a first signal processing section having a voltage hold section for receiving the voltage value outputted by the first output means of the pixel section, at least one voltage follower circuit that receives the voltage value output by the voltage hold section, and a subtraction circuit that receives the voltage value output by the at least one voltage follower circuit and outputs a first voltage value corresponding to the voltage value; and a second signal processing section having an integration circuit for receiving the electric charge amount outputted by the second output means of the pixel section, a correlated double sampling circuit that receives a voltage value output by the integration circuit, and a hold circuit that receives a voltage value output by the correlated double sampling circuit and outputs a second voltage value corresponding to the electric charge amount.

2. A photodetection apparatus according to claim 1, wherein the pixel section further comprises third output means for selectively outputting the electric charge generated by the photodiode via a route not passing through the first capacitance section and the second capacitance section, and the apparatus further comprises a third signal processing section for reading the electric charge amount outputted by the third output means of the pixel section and outputting a third voltage value corresponding to the electric charge amount.

3. A photodetection apparatus according to claim 2, wherein the second signal processing section includes the third signal processing section.

4. A photodetection apparatus according to claim 1, wherein the second signal processing section comprises:

an amplifier having a first input terminal, a second input terminal, and an output terminal, the first input terminal receiving the electric charge amount outputted by the second output means of the pixel section while the second input terminal receives a reference voltage; and a feedback capacitance section connected between the first input terminal and the output terminal of the amplifier, such that the electric charge amount outputted by the second output means of the pixel section is accumulated in the feedback capacitance section, so that a second voltage value corresponding to the amount of accumulated charge is outputted.

5. A photodetection apparatus according to claim 4, wherein the first input terminal of the amplifier of the second signal processing section is connected via a common terminal to the second output means and the initializing means of the pixel section, and a value of the reference voltage inputted to the second input terminal of the amplifier of the second signal processing section is variable.

6. A photodetection apparatus according to claim 4, wherein the feedback capacitance section comprises a plurality of capacitance elements having different capacitance values, and a plurality of switches which are each coupled to a respective capacitance element and are controlled to switch between open and closed states to selectably connect the capacitance elements between an input and output of the feedback capacitance section, thus changing the capacitance of the feedback capacitance section based on the open and closed states of the switches.

7. A photodetection apparatus according to claim 1, further comprising a selecting section for receiving the first voltage value outputted from the first signal processing section and the second voltage value outputted from the second signal processing section and selecting and outputting any one of these voltage values consisting of the first voltage value and the second voltage value.

8. A photodetection apparatus according to claim 2, further comprising a selecting section for receiving the first voltage value outputted from the first signal processing section, the second voltage value outputted from the second signal processing section, and the third voltage value outputted from the third signal processing section, and selecting and outputting any one of these voltage values consisting of the first voltage value, the second voltage value, and the third voltage value.

9. A photodetection apparatus according to claim 7 or 8, further comprising an A/D conversion section for receiving the voltage value outputted from the selecting section, performing A/D conversion on the voltage value received, and then outputting a digital value corresponding to the voltage value on which the A/D conversion has been performed.

10. A photodetection apparatus according to claim 9, further comprising a bit shift section for receiving the digital value outputted from the A/D conversion section, shifting the bit of the digital value depending on which value has been selected in the selecting section, and then outputting the value.

11. A photodetection apparatus according to claim 1, wherein the first signal processing section is connected to the first output means.

12. A photodetection apparatus according to claim 11, wherein the first output means comprises a transistor and the first signal processing section is connected to the transistor to receive the voltage value outputted from the transistor.

13. A photodetection apparatus according to claim 1, wherein the second signal processing section is connected to the second output means.

14. A photodetection apparatus according to claim 13, wherein the second output means comprises a transistor and the second signal processing section is connected to the transistor to receive the electric charge outputted from the transistor.

* * * * *